United States Patent
Sangret

[11] Patent Number: 5,842,538
[45] Date of Patent: Dec. 1, 1998

[54] POWER STEERING CONTROL VALVE

[75] Inventor: Henry C. Sangret, St. Clair Shores, Mich.

[73] Assignee: TRW Inc., Lyndhurst, Ohio

[21] Appl. No.: 608,407

[22] Filed: Feb. 28, 1996

[51] Int. Cl.$^6$ ........................................... B62D 5/08
[52] U.S. Cl. ........................................... 180/441; 91/375 A
[58] Field of Search ........................................... 180/441, 421, 180/422, 423; 91/375 A; 188/306, 307, 308, 309

[56] References Cited

U.S. PATENT DOCUMENTS

| | | |
|---|---|---|
| 4,034,825 | 7/1977 | Adams . |
| 4,434,866 | 3/1984 | Duffy . |
| 4,601,358 | 7/1986 | Kozuka et al. . |
| 4,718,514 | 1/1988 | Hirakushi . |
| 4,765,427 | 8/1988 | Yonker . |
| 4,768,630 | 9/1988 | Aubry et al. ........................ 188/307 |
| 4,796,715 | 1/1989 | Futaba et al. . |
| 5,016,723 | 5/1991 | Sano . |
| 5,058,696 | 10/1991 | Prebay et al. . |
| 5,070,957 | 12/1991 | Harkrader et al. . |
| 5,190,119 | 3/1993 | Nomura et al. . |
| 5,392,875 | 2/1995 | Duffy . |
| 5,396,969 | 3/1995 | Joerg et al. ........................ 180/441 |
| 5,542,343 | 8/1996 | Martin ........................ 180/441 |

Primary Examiner—Paul N. Dickson
Attorney, Agent, or Firm—Tarolli, Sundheim, Covell, Tummino & Szabo

[57] ABSTRACT

A power steering control valve (10) includes inner and outer valve members (30 and 32) which are rotatable relative to each other to control fluid flow to and from a power steering motor. A damping assembly (60) is provided to damp relative movement between the inner and outer valve members (30 and 32). The damping assembly (60) includes a pair of pistons (64 and 66) which are connected with the inner valve member (30) and extend into arcuate grooves (70 and 72) in the outer valve member (32). The pistons (64 and 66) cooperate with the arcuate grooves (70 and 72) in the outer valve member (32) to form variable volume chambers (76, 78, 80 and 82). Upon relative rotation between the inner and outer valve members (30 and 32) in a first (clockwise) direction, the pistons (64 and 66) are moved relative to the outer valve member (32) to contract a pair of chambers (76 and 82) and force fluid from the contracting chambers through restrictors (84 and 90) to a return fluid flow from the power steering motor. At the same time, movement of the pistons (64 and 66) expands a pair of chambers (78 and 80) to induce fluid flow through a second pair of restrictors (86 and 88) into the expanding chambers from the return flow of fluid to the power steering motor.

10 Claims, 4 Drawing Sheets

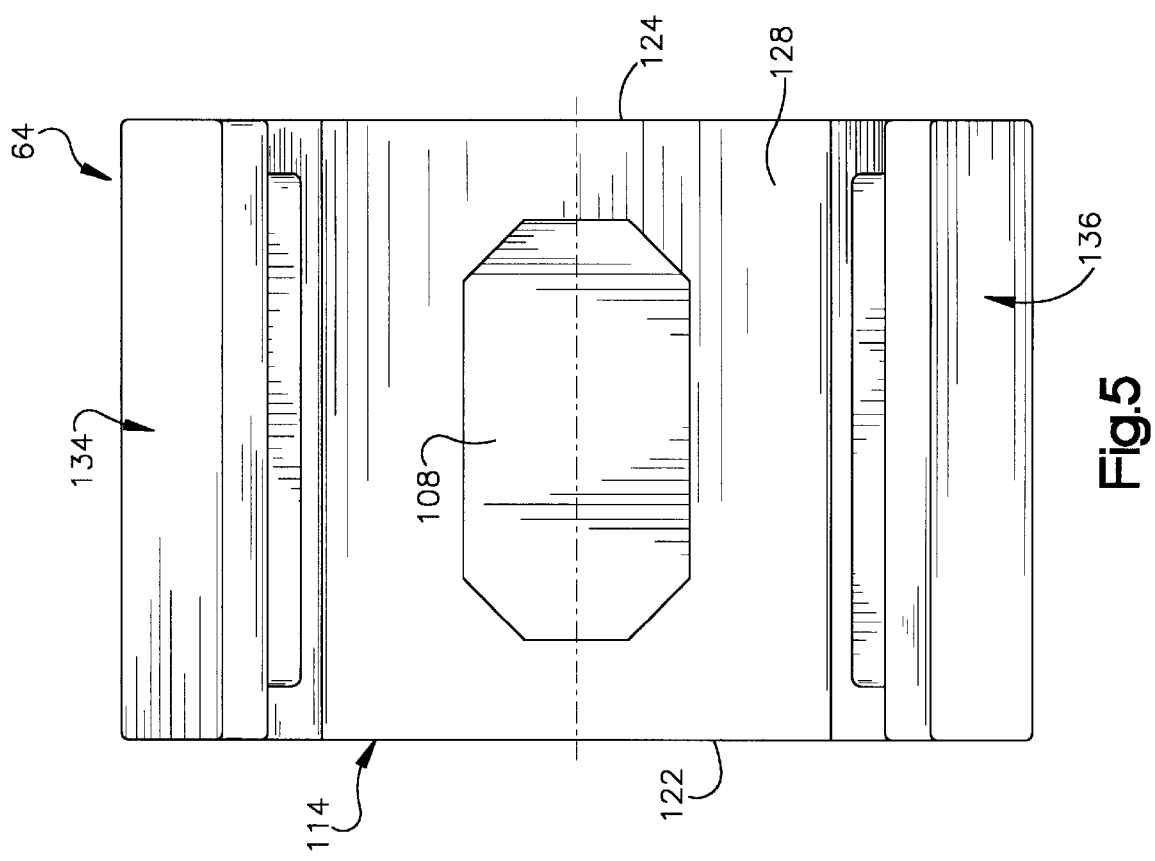
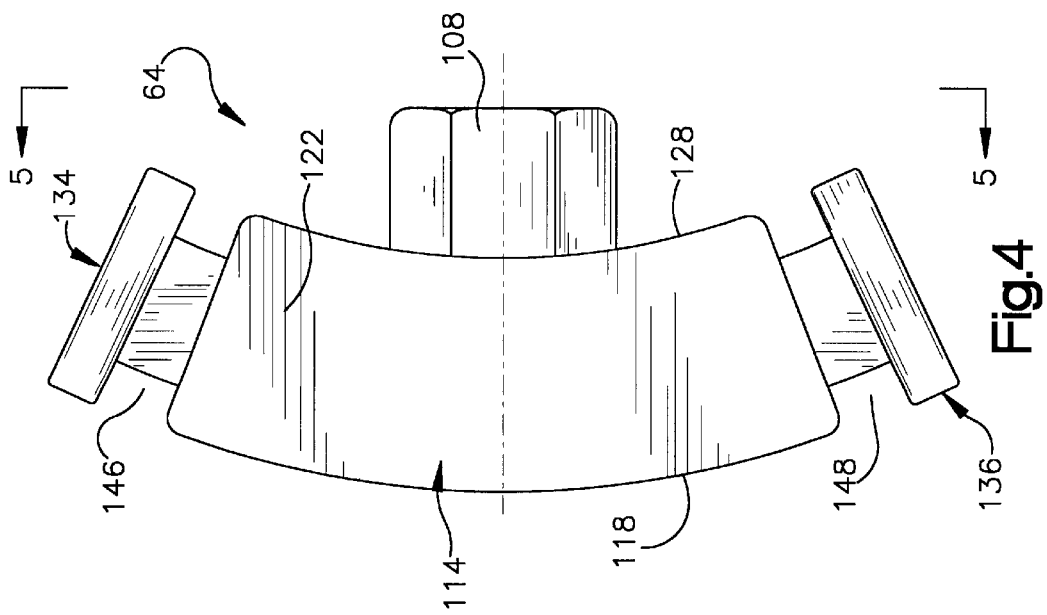

5,842,538

POWER STEERING CONTROL VALVE

BACKGROUND OF THE INVENTION

The present invention relates to a valve which controls the operation of a power steering motor.

Known power steering control valves include inner and outer valve members which are rotated relative to each other to control operation of a power steering motor. During operation of the valve assembly, there may be slight vibratory and/or oscillatory movement of the inner and outer valve members relative to each other. These small movements between the inner and outer valve members may result in a corresponding reaction from the power steering motor and a slight shuttering effect which may be detected by a driver of a vehicle.

SUMMARY OF THE INVENTION

The present invention provides a new and improved apparatus for use in a vehicle to control operation of a power steering motor. The apparatus includes inner and outer valve members which are rotatable relative to each other to control fluid flow to and from the power steering motor. A damping assembly is provided to dampen relative movement between the inner and outer valve members.

The damping assembly includes an arcuate groove which is formed in one of the valve members, for example, the outer valve member. A piston is connected with the other valve member, for example, the inner valve member. The piston and arcuate groove cooperate to form a variable volume chamber. Upon relative rotation between the inner and outer valve members, the piston moves relative to the groove to either expand or contract the variable volume chamber. Upon contraction of the variable volume chamber, fluid is forced from the chamber through a restrictor. Upon expansion of the variable volume chamber, a flow of fluid is induced into the chamber through the restrictor. The fluid flow to or from the chamber is effective to damp any tendency for vibratory or oscillatory movement to occur between the inner and outer valve members.

BRIEF DESCRIPTION OF THE DRAWINGS

The foregoing and other features of the present invention will become more apparent to one skilled in the art to which the present invention relates upon consideration of the following description of the invention with reference to the accompanying drawings, wherein:

FIG. 4 is an enlarged plan view of a piston used in the damping assembly of FIG. 2;

FIG. 5 is an elevational view, taken generally along the line 5—5 of FIG. 4, further illustrating the construction of the piston;

DESCRIPTION OF ONE SPECIFIC PREFERRED EMBODIMENT OF THE INVENTION

A power steering control valve 10 (FIG. 1) is used in a vehicle to control operation of a power steering motor (not shown) which is operable to turn steerable vehicle wheels. The power steering control valve 10 includes a housing 12. The housing 12 is connected with an engine driven power steering pump (not shown) through an inlet port 14. Power steering fluid from the pump flows to the inlet port 14 in the manner indicated schematically by the arrow 16 in FIG. 1.

Figure 1:
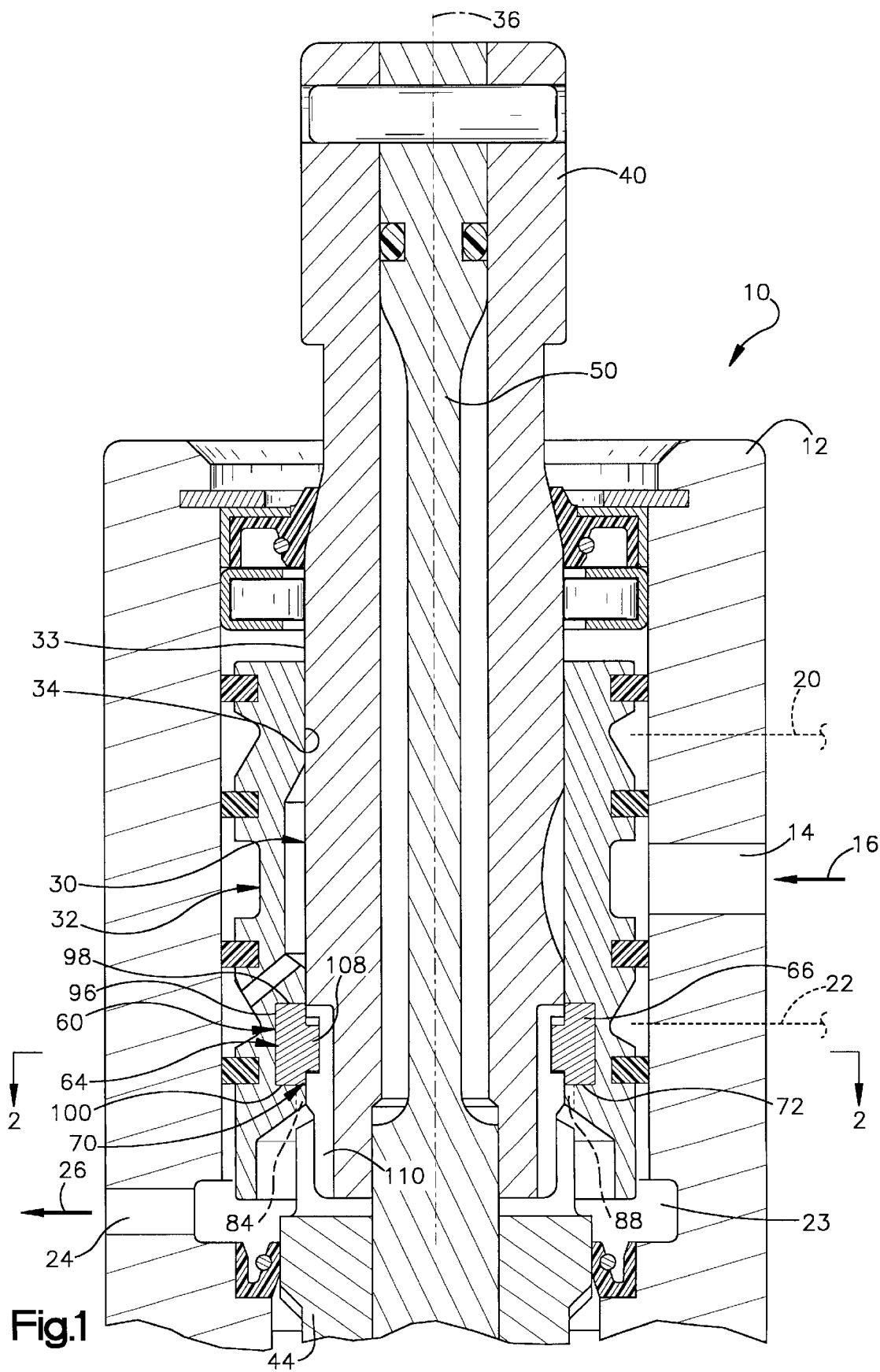
FIG. 1 is a fragmentary sectional view of a power steering control valve constructed in accordance with the present invention.

The housing 12 is connected with a power steering motor (not shown) through motor conduits, indicated schematically at 20 and 22 in FIG. 1. Fluid from the power steering motor and/or the inlet port 14 is conducted to a return chamber 23 in the housing 12. The return chamber 23 holds fluid at a very low or minimal pressure corresponding to drain pressure.

The fluid is conducted from the return chamber 23 in the housing 12 through an outlet port 24. The return fluid is conducted to a reservoir for the power steering pump, in the manner indicated schematically by the arrow 26 in FIG. 1.

The power steering control valve 10 includes an inner valve member 30 and an outer valve member 32. The outer valve member 32 is a cylindrical sleeve which encloses the generally cylindrical inner valve member 30. The inner valve member 30 has a cylindrical outer side surface 33 which is engaged by a cylindrical inner side surface 34 on the outer valve member 32. The inner valve member 30 and outer valve member 32 are rotatable relative to each other and to the housing 12 about a common central axis 36.

The generally cylindrical inner valve member 30 is formed as one piece with a cylindrical valve stem 40. The valve stem 40 is connected with a steering wheel of a vehicle. The one piece outer valve member 32 is disposed in a coaxial relationship with the inner valve member 30. The outer valve member 32 is connected with a follow-up member 44. The follow-up member 44 is rotatably supported in the housing 12 and is connected with a pinion gear (not shown) which is disposed in meshing engagement with a rack (not shown). The rack is connected with the power steering motor and steerable vehicle wheels.

The power steering control valve 10 is of the open center type. Therefore, when the power steering control valve 10 is in an initial or unactuated condition, fluid pressure from the power steering pump is conducted into the housing 12 through the inlet port 14. The fluid pressure is conducted through the motor conduits 20 and 22 to cylinder chambers in the piston and cylinder type power steering motor. Fluid flow is conducted from the return chamber 23 in the housing 12 through the outlet port 24 back to the reservoir for the pump.

Upon actuation of the power steering control valve 10, the pressure in one of the chambers of the power steering motor is increased while the pressure in the other chamber is decreased. This effects operation of the power steering motor to turn the steerable vehicle wheels.

For example, rotation of the inner valve member 30 in one direction relative to the outer valve member 32 will reduce the extent of communication of the motor conduit 20 with the outlet port 24 and increase the extent of communication of the motor conduit 20 with the inlet port 14. This results in high pressure fluid from the power steering pump being conducted to a motor cylinder chamber through the motor conduit 20. This high pressure fluid moves a piston in the power steering motor. As the piston in the power steering motor moves, fluid is discharged from the opposite chamber of the power steering motor and is conducted through the motor conduit 22 to the return chamber 23 in the housing 12. The fluid is conducted, at a relatively low pressure, from the return chamber 23 through the outlet port 24 to the reservoir for the power steering pump.

The inner and outer valve members 30 and 32 (FIG. 1) are interconnected by a torsion bar 50. One end of the torsion bar 50 is connected with the valve stem 40 and the opposite end of the torsion bar 50 is connected with the follow-up member 44. The torsion bar 50 twists to enable relative rotation to occur between the inner and outer valve members 30 and 32.

The inner and outer valve members 30 and 32 have a generally known construction and cooperate with each other in the same manner as is disclosed in U.S. Pat. Nos. 4,276,812; 5,230,273; and 5,361,861. The inner and outer valve members 30 and 32 cooperate with the power steering pump and motor in the same general manner as is disclosed in U.S. Pat. Nos. 3,709,099 and 4,942,803. It should be understood that it is contemplated that the inner and outer valve members 30 and 32 may have any one of many different known constructions and may cooperate with each other to control the operation of the any one of many different known types of power steering motors.

Damping Assembly

In accordance with a feature of the present invention, a damping assembly 60 (FIGS. 1 and 2) is provided to damp relative movement between the inner and outer valve members 30 and 32. Thus, upon actuation of the power steering control valve 10, the damping assembly 60 cooperates with the inner and outer valve members 30 and 32 to minimize any tendency for vibratory and/or oscillatory movement to occur between the inner and outer valve members. The damping assembly 60 is effective to eliminate or at least minimize instabilities which may occur upon actuation of the power steering control valve 10.

The damping assembly 60 includes a pair of pistons 64 and 66 (FIG. 2) which are disposed between and enclosed by the inner and outer valve members 30 and 32. The pistons 64 and 66 are secured to diametrically opposite sides of the inner valve member 30. The pistons 64 and 66 extend into diametrically opposite arcuate grooves 70 and 72 formed in the outer valve member 32. The pistons 64 and 66 rotate with the inner valve member 30. The arcuate grooves 70 and 72 rotate with the outer valve member 32.

Each of the arcuate grooves 70 or 72 is divided into a pair of variable volume chambers by one of the pistons 64 or 66. Thus, the arcuate groove 70 is divided into a pair of variable volume chambers 76 and 78 by the piston 64. Similarly, the arcuate groove 72 is divided into a pair of variable volume chambers 80 and 82 by the piston 66. Although two pistons 64 and 66 have been illustrated in FIG. 2 as being associated with a pair of arcuate grooves 70 and 72, it should be understood that a greater or lesser number of pistons and arcuate grooves could be provided in the damping assembly 60 if desired. Although the pistons 64 and 66 have been illustrated in FIG. 2 as being connected with the inner valve member 30, the pistons could be connected with the outer valve member 32 and the arcuate grooves 70 and 72 formed in the inner valve member if desired.

A flow control orifice or restrictor connects each of the variable volume chambers 76–82 in fluid communication with the relatively low pressure fluid in the return chamber 23 (FIG. 1). Thus, the variable volume chamber 76 (FIG. 2) is connected in fluid communication with the low pressure fluid in the return chamber 23 through a flow control orifice or restrictor 84. The variable volume chamber 78 is connected in fluid communication with the low pressure fluid in the return chamber 23 through a flow control orifice or restrictor 86. Similarly, the variable volume chambers 80 and 82 are connected in fluid communication with the low pressure fluid in the return chamber 23 through flow control orifices or restrictors 88 and 90. The flow control orifices or restrictors 84–90 restrict fluid flow to and from the variable volume chambers 76–82 to dampen vibratory and/or oscillatory movement upon relative rotation between the inner and outer valve members 30 and 32.

Upon rotation of the inner valve member 30 (FIG. 2) relative to the outer valve member 32, one of the chambers 76 or 78 in the arcuate groove 70 expands. As one of the chambers 76 or 78 expands, the other chamber contracts. At the same time, one of the chambers 80 or 82 in the arcuate groove 72 expands while the other chamber contracts.

Upon rotation of the inner valve member 30 in a clockwise direction (as viewed in FIG. 2) relative to the outer valve member 32, force is transmitted from the inner valve member 30 to the piston 64. This force causes the piston 64 to rotate with the inner valve member about the central axis 36 (FIG. 1). This results in the variable volume chamber 76 (FIG. 2) being contracted and the variable volume chamber 78 being expanded.

Contraction of the variable volume chamber 76 (FIG. 2) forces fluid from the arcuate groove 70 through the restrictor 84 into the return chamber 23. Expansion of the variable volume chamber 78 induces a flow of fluid from the return chamber 23 through the restrictor 86 into the variable volume chamber 78. Since opposite sides of the piston 64 are connected in fluid communication with the low pressure fluid in the return chamber 23 through the restrictors 84 and 86, the piston is moved in the arcuate groove 70 under the influence of force transmitted to the piston from the inner valve member 30.

Similarly, upon rotation of the inner valve member 30 in a counterclockwise direction (as viewed in FIG. 2) relative to the outer valve member 32, the piston 64 moves in the arcuate groove 70 with the inner valve member 30. This results in the variable volume chamber 78 being contracted and the variable volume chamber 76 being expanded. Contraction of the variable volume chamber 78 forces fluid from the arcuate groove 70 through the restrictor 86 into the flow of low pressure fluid in the return chamber 23. At the same time, expansion of the variable volume chamber 76 reduces the fluid pressure in the variable volume chamber 76 to induce a flow of relatively low pressure fluid from the return chamber 23 through the restrictor 84 into the variable volume chamber 76.

The piston 66 cooperates with the arcuate groove 72 to vary the size of the variable volume chambers 80 and 82 in the same manner as in which the piston 64 cooperates with the arcuate groove 70. Thus, upon rotation of the inner valve member 30 in a clockwise direction (as viewed in FIG. 2) relative to the outer valve member 32, the piston 66 rotates with the inner valve member. This contracts the variable volume chamber 82 and forces fluid through the restrictor 90. At the same time, the variable volume chamber 80 expands to induce a flow of fluid through the restrictor 88 into the variable volume chamber 80. Similarly, upon rotation of the inner valve member 30 in a counterclockwise direction (as viewed in FIG. 2) relative to the outer valve member 32, the piston 66 forces fluid from the chamber 80 through the restrictor 88 and induces a flow of fluid through the restrictor 90 into the chamber 82.

Upon rotation of the outer valve member 32 relative to the inner valve member 30 by the follow-up member 44, the arcuate grooves 70 and 72 move relative to the pistons 64 and 66. Thus, upon rotation of the outer valve member 32 in a clockwise direction (as viewed in FIG. 2) by the follow-up member 44, the variable volume chambers 76 and 82 expand and the variable volume chambers 78 and 80 contract. Similarly, upon rotation of the outer valve member 32 in a counterclockwise direction (as viewed in FIG. 2) by the follow-up member 44, the variable volume chambers 76 and 82 contract and the variable volume chambers 78 and 80 expand.

Figure 2:
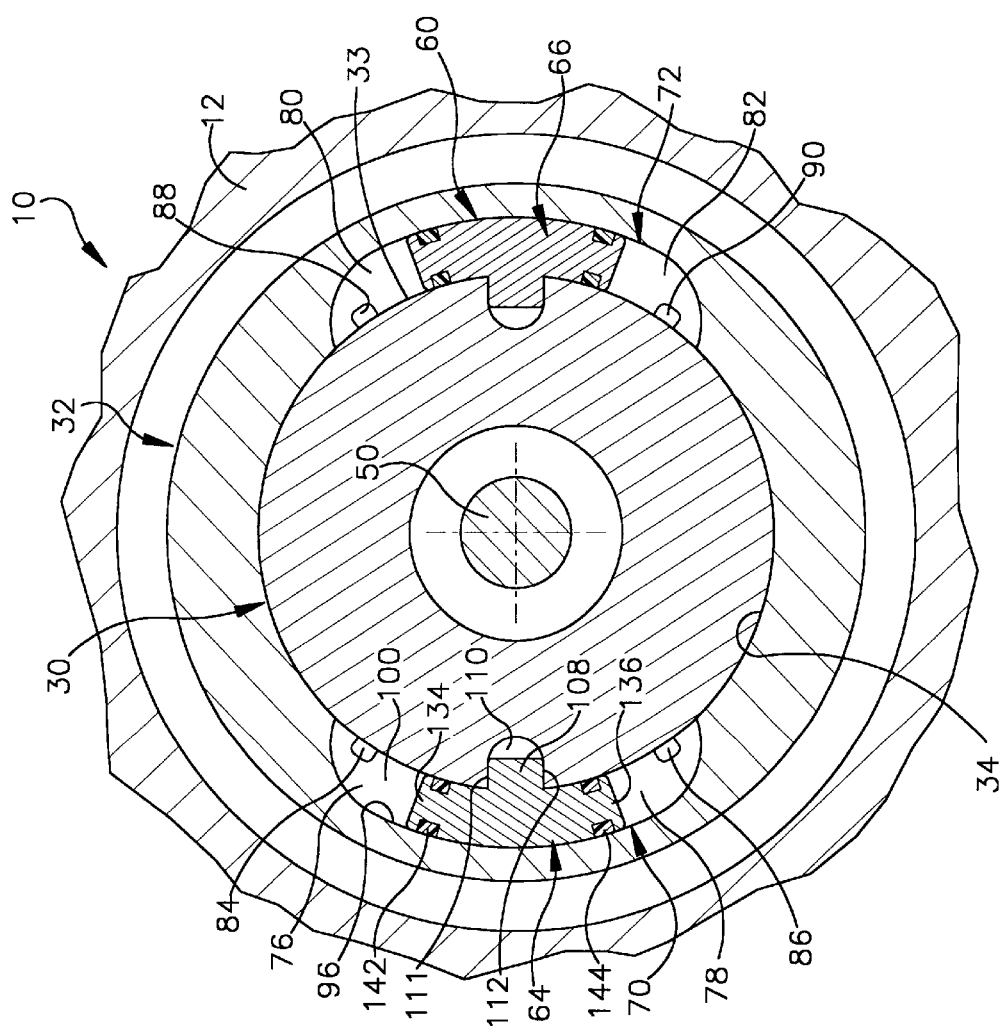
FIG. 2 is an enlarged sectional view, taken generally along the line 2—2 of FIG. 1, illustrating the construction of a damping assembly which dampens relative movement between inner and outer valve members in the power steering control valve.

Although the damping assembly 60 has been illustrated in FIG. 2 as having two pistons 64 and 66, it is contemplated that the damping assembly could have a greater or lesser number of pistons if desired. Although it is preferred to have the pistons 64 and 66 connected with the inner valve member 30 and extend into arcuate grooves 70 and 72 in the outer valve member 32, the pistons could be connected with the outer valve member and extend into grooves formed in the inner valve member if desired.

In the illustrated embodiment of the invention, the arcuate groove 70 opens or faces toward the cylindrical outer side surface 33 on the inner valve member 30. The groove 70 has an arcuate bottom surface 96 (FIG. 2) which has a center of curvature disposed on the central axis 36 (FIG. 1) of the inner valve member 30. The bottom surface 96 (FIG. 2) of the arcuate groove 70 is formed as a portion of an outer side surface of a cylinder which is coaxial with the inner and outer valve members 30 and 32.

The arcuate groove 70 is further defined by a pair of parallel side surfaces 98 and 100 (FIG. 1). The side surfaces 98 and 100 are disposed in parallel planes which extend perpendicular to the central axis 36 of the inner and outer valve members 30 and 32. Opposite end portions of the arcuate groove 78 are tapered toward the inner valve member 30.

The restrictors 84 and 86 have openings formed in the lower side wall 100 (FIG. 2) of the tapering end portions of the arcuate groove 70. Since the openings to the restrictors 84 and 86 are disposed in the tapering end portions of the arcuate groove 70, the piston 64 cannot move in the arcuate groove to a position in which it blocks either one of the openings. The restrictors 84 and 86 are axially extending grooves formed in the cylindrical inner side surface 34 of the outer valve member 32. The grooves forming the restrictors 84 and 86 extend axially downward (as viewed in FIG. 1) to the return chamber 23. The restrictors 88 and 90 have the same construction as the restrictors 84 and 86.

Piston

The piston 64 (FIGS. 2, 4 and 5) has a polygonal mounting section 108 which extends into a groove 110 (FIGS. 2 and 3) formed in the inner valve member 30. The groove 110 in the inner valve member 30 (FIG. 3) has a longitudinal central axis which extends parallel to the longitudinal central axis 36 of the inner valve member.

Figure 3:
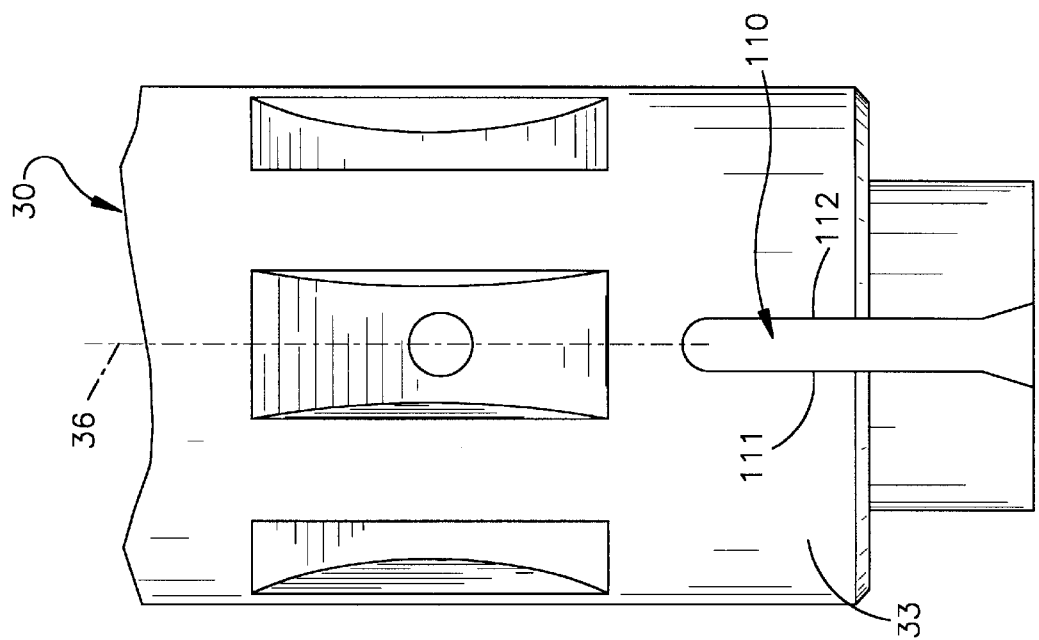
FIG. 3 is a fragmentary view of a portion of the inner valve member.

The mounting section 108 of the piston 64 has a polygonal configuration (FIG. 5) and engages parallel side surfaces 111 and 112 of the groove 110 (FIG. 3). Upon relative rotation between the inner and outer valve members 30 and 32 (FIG. 2), force is transmitted between the inner valve member and the mounting section 108 of the piston 64. This force results in relative movement between the piston 64 and groove 70.

In addition to the mounting section 108, the piston 64 has an arcuate body section 114 (FIG. 4). The body section 114 has the same arc of curvature as the arcuate groove 70. Since the body section 114 of the piston 64 has the same arc of curvature as the arcuate groove 70, the body section 114 of the piston can be moved longitudinally along the arcuate groove 70 upon the occurrence of relative rotation between the inner and outer valve members 30 and 32.

The body section 114 of the piston 64 has an arcuate radially outer side surface 118 (FIG. 4) with the same arc of curvature and configuration as the bottom surface 96 (FIG. 2) of the arcuate groove 70. The outer side surface 118 on the body section 114 of the piston 64 engages the arcuate bottom surface of the groove 70 (FIG. 2).

In addition, the body section 114 of the piston 64 has parallel arcuate side surfaces 122 and 124 (FIG. 5) which engage opposite side surfaces 98 and 100 (FIG. 1) of the arcuate groove 70. The body section 114 of the piston 64 also has an arcuate inner side surface 128 (FIGS. 4 and 5) which engages a cylindrical outer side surface of the inner valve member 30 (FIG. 2). The inner and outer side surfaces 118 and 128 (FIG. 4) of the body section 114 of the piston have centers of curvature which are disposed on the central axis 36 (FIG. 1) of the inner valve member 30 and outer valve member 32.

The piston 64 has a pair of head end sections 134 and 136 (FIGS. 4 and 5). The head end sections 134 and 136 of the piston 64 cooperate with the arcuate groove 70 to form the variable volume chambers 76 and 78 (FIG. 2). A pair of seal rings 142 and 144 are disposed in grooves 146 and 148 (FIG. 4) which separate the head end sections 134 and 136 of the piston 64 from the body section 114. The seal rings 142 and 144 (FIG. 2) sealingly engage the surfaces of the arcuate groove 70 and the cylindrical outer side surface 94 of the inner valve member 30.

Although it is contemplated that the piston 64 could be made of many different materials, it is believed that the piston 64 may be advantageously cast from zinc. Of course, the piston 64 could be formed of a suitable polymeric material if desired. Although the construction of only the piston 64 is illustrated in FIGS. 4 and 5, it should be understood that the piston 66 has the same construction as the piston 64 and cooperates with the arcuate groove 72 in the same manner as in which the piston 64 cooperates with the arcuate groove 70. The pistons 64 and 66 are both fully enclosed by the inner and outer valve members 30 and 32.

Operation

Figure 6:
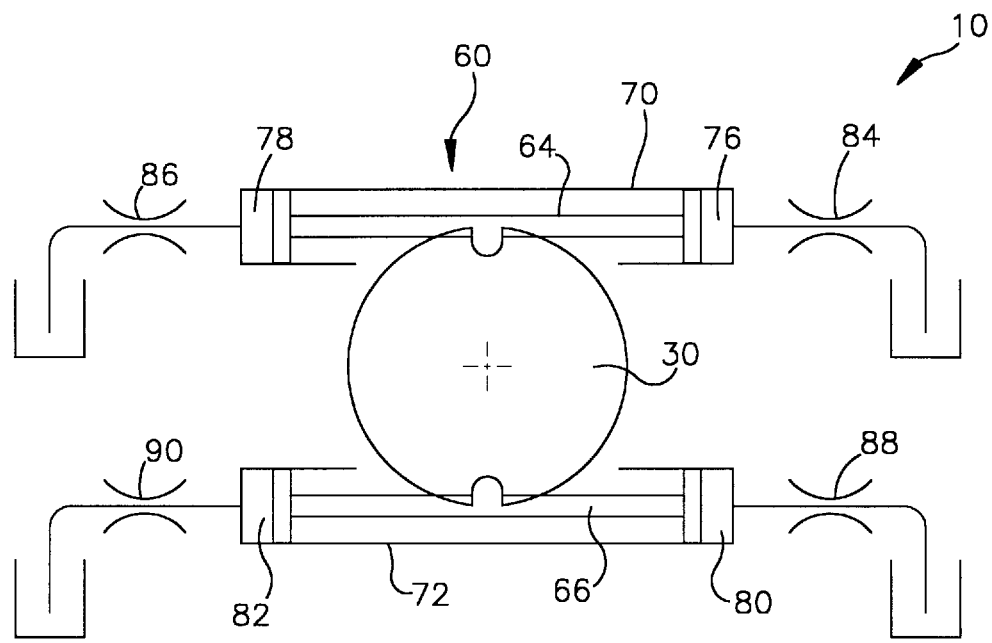
FIG. 6 is a schematic illustration depicting the relationship of the damping assembly to the inner and outer valve members prior to actuation of the steering control valve.

When the power steering control valve 10 is in the initial or unactuated condition, the damping assembly 60 is in the condition illustrated schematically in FIG. 6. At this time, the pistons 64 and 66 are centered in the grooves 70 and 72. The variable volume chambers 76, 78, 80 and 82 are of the same size and are connected with fluid return or drain through the restrictors 84, 86, 88 and 90. The variable volume chambers 76–82 are filled with fluid (FIG. 6). Since the variable volume chambers 76–82 are connected with drain through the restrictors 84–90, there is minimal fluid pressure in the variable volume chambers.

Figure 7:
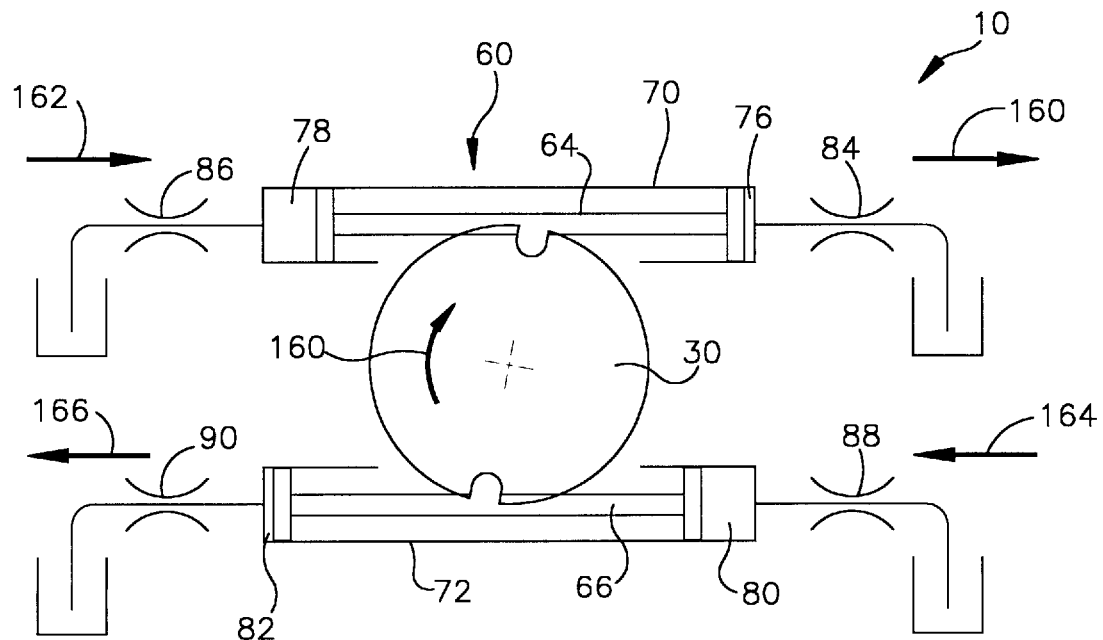
FIG. 7 is a schematic illustration, generally similar to FIG. 6, illustrating the operation of the damping assembly upon actuation of the power steering control valve.

Upon rotation of the inner valve member 30, in a clockwise direction as indicated by the arrow 160 in FIG. 7, the piston 64 is rotated by the inner valve member 30 in the groove 70. Thus, force is transmitted from the inner valve member 30 to the piston 64 to move the piston in the groove 70. Rotation of the piston 64 with the inner valve member 30 decreases the size of the variable volume chamber 76 and increases the size of the variable volume chamber 78.

As the size of the variable volume chamber 76 is decreased, fluid is forced from the variable volume chamber 76 through the restrictor 84 to drain, in the manner indicated by the arrow 160 in FIG. 7. At the same time, the variable volume chamber 78 is expanded. As the variable volume chamber 78 expands, the fluid pressure in the variable volume chamber is reduced. This results in fluid being drawn from drain through the restrictor 86 into the variable volume chamber 78 in the manner indicated by the arrow 162 in FIG. 7.

Of course, as the piston 64 is moved in the arcuate recess 70 by clockwise rotation of the inner valve member 30, in the manner indicated schematically in FIG. 7, the piston 66 is moved in the arcuate recess 72. Movement of the piston 66 in the arcuate recess 72 increases the size of the variable volume chamber 80 and decreases the size of the variable volume chamber 82. Increasing the size of the variable volume chamber 80 reduces the pressure in the variable volume chamber. Fluid is drawn from drain through the restrictor 88 into the variable volume chamber 80, in the manner indicated by the arrow 164 in FIG. 7. At the same time, the piston 66 forces fluid to flow from the variable volume chamber 82 through the restrictor 90 to drain, in the manner indicated by the arrow 166 in FIG. 7.

Upon rotation of the inner valve member 30 in a counterclockwise direction, the pistons 64 and 66 are moved in the arcuate grooves 70 and 72 to expand the variable volume chambers 76 and 82 and contract the variable volume chambers 78 and 80. As this occurs, fluid is drawn through the restrictors 84 and 90 into the expanding variable volume chambers 76 and 82 and is pumped from the contracting variable volume chambers 78 and 80 through the restrictors 86 and 88.

Due to the resistance to fluid flow through the restrictors 84–90, the damping assembly 60 retards vibratory and/or oscillatory movement between the inner and outer valve members 30 and 32. This results in smooth operation of the power steering control valve 10 and the power steering motor connected with the power steering control valve.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for use in a vehicle to control operation of a power steering motor, said apparatus comprising:

first and second valve members which are rotatable relative to each other to control fluid flow to and from the power steering motor;

damping means for damping relative movement between said first and second valve members, said damping means including a plurality of surface means rotatable with said first valve member for at least partially defining a plurality of chambers which hold fluid and a plurality of pistons rotatable with said second valve member, said plurality of pistons and surface means being movable relative to each other to contract first and second chambers of said plurality of chambers and force fluid to flow from said first and second chambers and to expand third and fourth chambers of said plurality of chambers and to enable fluid to flow into said third and fourth chambers upon relative rotation between said first and second valve members in a first direction, said plurality of pistons and surface means being movable relative to each other to expand said first and second chambers and enable fluid to flow into said first and second chambers and contract said third and fourth chambers and to force fluid to flow from said third and fourth chambers upon relative rotation between said first and second members in a second direction opposite to said first direction; and first and second restrictor means for restricting fluid flow from said first and second chambers and third and fourth restrictor means for restricting fluid flow into said third and fourth chambers upon relative rotation between said first and second valve members in the first direction, said first and second restrictor means restricting fluid flow into said first and second chambers and said third and fourth restrictor means restricting fluid flow from said third and fourth chambers upon relative rotation between said first and second valve members in the second direction.

2. An apparatus as set forth in claim 1 wherein each of said plurality of surface means is disposed on said first valve member and defines a groove which opens toward said second valve member, each of said plurality of pistons extends from said second valve members into one of said grooves.

3. An apparatus as set forth in claim 1 wherein each of said plurality of surface means includes an arcuate surface having a center of curvature which is disposed on an axis about which said first and second valve members are rotatable relative to each other, said plurality of pistons being rotatable with said second valve member relative to said first valve member with said plurality of pistons disposed in engagement with said arcuate surfaces.

4. An apparatus as set forth in claim 1 wherein each of said plurality of surface means includes an arcuate surface having a center of curvature which is disposed on an axis about which said first and second valve members are rotatable relative to each other, each of said plurality of pistons includes an arcuate side surface having a center of curvature which is disposed on the axis about which said first and second valve members are rotatable relative to each other, said arcuate side surface on each of said plurality of pistons being disposed in engagement with one of said arcuate surfaces of said plurality of surface means.

5. An apparatus as set forth in claim 1 wherein said first and second valve members have cylindrical side surfaces which are disposed in engagement with each other, each of said plurality of surface means at least partially defining an arcuate groove having a center of curvature disposed on a central axis of the cylindrical side surface of said first valve member, each of said plurality of pistons extends from said second valve member into one of said grooves and is movable along said one of said grooves upon relative rotation between said first and second valve members.

6. An apparatus for use in a vehicle to control operation of a power steering motor, said apparatus comprising:

first and second valve members which are rotatable relative to each other to control fluid flow to and from the power steering motor; and damping means for damping relative movement between said first and second valve members, said damping means including a plurality of surface means rotatable with said first valve member for at least partially defining a plurality of chambers which hold fluid and a plurality of pistons rotatable with said second valve member, said plurality of pistons and surface means being movable relative to each other to contract first and second chambers of said plurality of chambers and force fluid to flow from said first and second chambers and to expand third and fourth chambers of said plurality of chambers and to enable fluid to flow into said third and fourth chambers upon relative rotation between said first and second valve members in a first direction, said plurality of pistons and surface means being movable relative to each other to expand said first and second chambers and enable fluid to flow into said first and second chambers and contract said third and fourth chambers and to force fluid to flow from said third and fourth chambers upon relative rotation between said first and second members in a second direction opposite to said first direction;

each of said chambers being connected in fluid communication with a flow of fluid from the power steering motor through a restrictor, said plurality of pistons and surface means being movable relative to each other upon relative rotation between said first and second valve members in the first direction to induce a flow of fluid from the first and second chambers through first and second restrictors into the flow of fluid from the power steering motor and to induce a flow of fluid from the flow of fluid from the power steering motor through third and fourth restrictors into the third and fourth chambers, said plurality of pistons and surface means being movable relative to each other upon relative rotation between said first and second valve members in the second direction to induce a flow of fluid from the flow of fluid from the power steering motor through said first and second restrictors into the first and second chambers and to induce a flow of fluid from the third and fourth chambers through said third and fourth restrictors into the flow of fluid from the power steering motor.

7. An apparatus for use in a vehicle to control operation of a power steering motor, said apparatus comprising:

first and second valve members which are rotatable relative to each other about an axis of rotation to control fluid flow to and from the power steering motor, said first valve member having first and second arcuate grooves which open toward said second valve member and have a center of curvature disposed on the axis of rotation of said first and second valve members;

first and second pistons connected with said second valve member, said first piston extending from said second valve member into said first arcuate groove in said first valve member, said second piston extending from said second valve member into said second arcuate groove in said first valve member, said first piston cooperating with said first arcuate groove in said first valve member to at least partially define first and second chambers disposed on opposite sides of said first piston, said second piston cooperating with said second arcuate groove in said first valve member to at least partially define third and fourth chambers on opposite sides of said second piston;

a first restrictor connected with said first valve member to restrict fluid flow to and from said first chamber;

a second restrictor connected with said first valve member to restrict fluid flow to and from said second chamber;

a third restrictor connected with said first valve member to restrict fluid flow to and from said third chamber;

a fourth restrictor connected with said first valve member to restrict fluid flow to and from said fourth chamber;

said first piston and groove being movable relative to each other to induce a flow of fluid from said first chamber through said first restrictor and to induce a flow of fluid to said second chamber through said second restrictor upon relative rotation between said first and second valve members in a first direction, said first piston and groove being movable relative to each other to induce a flow of fluid from said second chamber through said second restrictor and to induce a flow of fluid to said first chamber through said first restrictor upon relative rotation between said first and second valve member in a second direction opposite said first direction;

said second piston and groove being movable relative to each other to induce a flow of fluid from said third chamber through said third restrictor and to induce a flow of fluid to said fourth chamber through said fourth restrictor upon relative rotation between said first and second valve members in said first direction, said second piston and groove being movable relative to each other to induce a flow of fluid from said fourth chamber through said fourth restrictor and to induce a flow of fluid to said third chamber through said third restrictor upon relative rotation between said first and second valve members in said second direction.

8. An apparatus as set forth in claim 7 wherein each of said restrictors is connected in fluid communication with a flow of fluid from the power steering motor.

9. An apparatus as set forth in claim 7 wherein said first and second pistons are pressed against fluid in said first and third chambers under the influence of force transmitted from said second valve member to said first and second pistons upon relative rotation between said first and second valve members in the first direction to thereby induce a flow of fluid from the first and third chambers through said first and third restrictors, said first and second pistons being pressed against fluid in said second and fourth chambers under the influence of force transmitted from said second valve member to said first and second pistons upon relative rotation between said first and second valve members in the second direction to thereby induce a flow of fluid from the second and fourth chambers through said second and fourth restrictors.

10. An apparatus as set forth in claim 7 wherein said first and second pistons are moved relative to said first and second grooves under the influence of force transmitted to said first and second pistons from said second valve member to expand said second and fourth chambers to reduce the fluid pressure in said second and fourth chambers and induce a flow of fluid through said second and fourth restrictors into said second and fourth chambers upon relative rotation between said first and second valve members, in the first direction, said first and second pistons being moved relative to said first and second grooves under the influence of force transmitted to said first and second pistons from said second valve member to expand said first and third chambers to reduce the fluid pressure in said first and third chambers and induce a flow of fluid through said first and third restrictors into said first and third chambers upon relative rotation between said first and second valve members in the second direction.

* * * * *